Aug. 7, 1945.  H. M. GREENMAN  2,380,963

GOVERNOR ADJUSTING MECHANISM

Filed Jan. 14, 1943

INVENTOR
Hugh M. Greenman
By Parker, Carlson, Pitzner & Hubbard
ATTORNEYS

Patented Aug. 7, 1945

2,380,963

UNITED STATES PATENT OFFICE 2,380,963

GOVERNOR ADJUSTING MECHANISM

Hugh M. Greenman, Rockford, Ill., assignor to Woodward Governor Company, Rockford, Ill., a corporation of Illinois Application January 14, 1943, Serial No. 472,325

7 Claims. (Cl. 264—3)

This invention relates to an improvement in the governor adjusting mechanism disclosed in Patent No. 2,264,874 and incorporating a means for establishing a preselected speed setting of the governor in the event that the normally active speed setting mechanism is disabled.

The general object is to provide a mechanism of the above character which enables the preselected speed setting to be established with greater accuracy and more reliably than in the patented construction.

Another object is to provide such a mechanism in which the preselected speed setting is established without balancing one spring against another while at the same time permitting normal changing of the speed setting in either direction from the preselected or emergency setting.

Figure 1:
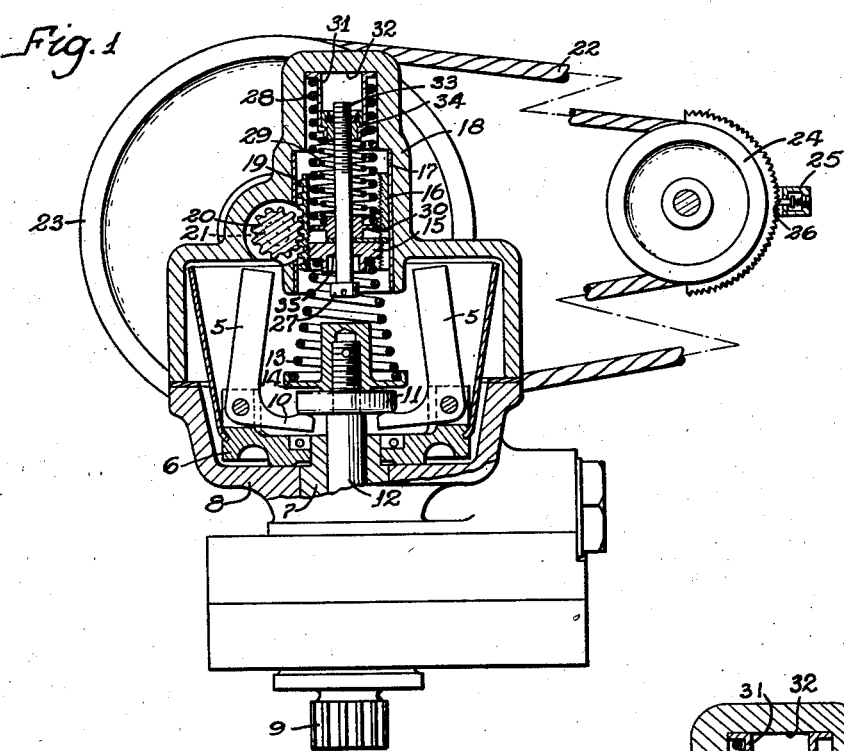

Other objects and advantages of the invention will become apparent from the following detailed description taken in connection with the accompanying drawing, in which Figure 1 is an elevational view, part in longitudinal section, of a governor incorporating an adjusting mechanism embodying the present invention.

Figure 2:
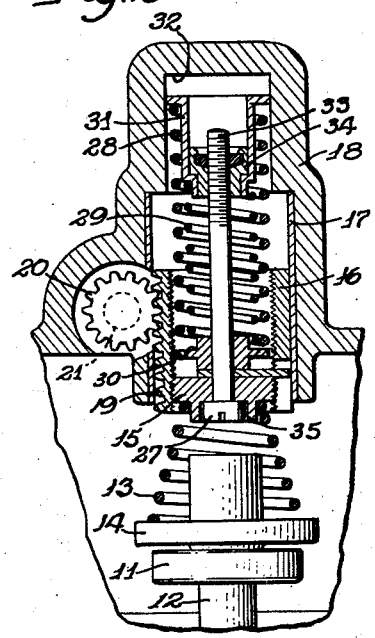
Figure 3:
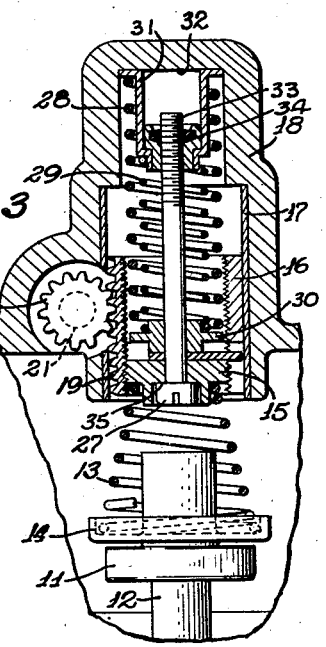

Figs. 2 and 3 are enlarged fragmentary views showing other positions of the parts.

In the drawing, the invention is shown for purposes of illustration associated with a governor of the type disclosed in Woodward Patent No. 2,204,640 to which reference may be made for further details. In general, the governor includes flyballs 5 pivoted on a head 6 which is fast on a vertical sleeve 7 journaled in a casing 8 and driven from the controlled prime mover through a gear 9 on the lower end of the sleeve 7. Arms 10 on the flyballs bear upwardly against the outer race of a ball bearing 11, the inner race of which is carried by the stem 12 of a valve which is operated to regulate the speed of operation of the controlled prime mover.

The force applied to the stem by the rotating flyballs is balanced against a downwardly directed force exerted by a coiled speeder spring 13 acting in compression between a cap 14 on the upper end of the stem 12 and a movable abutment in the form of a plug 15 threading into the lower end of a sleeve 16 which is slidable axially in a vertical guide bushing 17 in a cylindrical extension 18 of the governor casing. Along one side, the sleeve 16 is formed with rack teeth 19 meshing with a pinion 20 on a shaft 21 so that the angular position of the shaft determines the loading of the spring 13 and therefore the speed setting of the governor.

While the shaft may be turned by power actuated means controlled manually or automatically, it is shown herein adapted for manual adjustment through the medium of a cable 22 extending around a pulley 23 on the outer end of the shaft 21 which is journaled in and projects outwardly through the casing 8. The cable extends to a remote point of control and around a pulley 24 adapted to be adjusted angularly as by turning a lever 25 whose adjustment is retained by a spring actuated detent 26 coacting with a toothed segment. Suitable stops, preferably located externally of the governor, are provided for determining the speed adjusting range. The abutment 15 is disposed above the position shown in Fig. 1 at the minimum or low speed setting and substantially below the position shown in Fig. 3 when the governor is set for maximum engine speed.

In the event that the operating connection for adjusting the speeder spring 13 is disabled as by breakage of the cable 22, the abutment 15 tends to move upwardly to the low speed setting. To avoid such an undesirable reduction in the output of the prime mover, the present invention contemplates the provision of means which is adapted to overcome the action of the speeder spring and is capable of loading the latter to a degree positively determined without balancing of the speeder spring loading whereby to establish an emergency speed setting intermediate the high and low speed settings above referred to. Herein this means comprises an auxiliary spring substantially stronger than the main speeder spring 13 at the desired emergency speed setting of the latter and coacting with a stop 27 which is positioned in accordance with the speed setting desired. The auxiliary spring herein shown comprises two concentric coils 28 and 29 both acting on a washer 30 which rests on the plug 15. The upper end of the spring 28 bears against a flange on a member 31 which is slidable axially in the upper portion of the housing 18 and is adapted to seat against a fixed abutment defined by the extension end 32. The spring 29 seats against a shoulder on the member 31 and is disposed within the spring 28 and axially of the speeder spring 13. The combined force of the springs 28 and 29 is substantially greater than that of the speeder spring 13 at or below the emergency speed setting of the latter.

The stop 27 is disposed within the spring coil 13 and comprises the head of a screw 33 which is slidable in the plug 15 and the washer 30 and projects upwardly through the springs, the upper end threading into a shouldered nut 34 disposed within the member 31. By turning the screw into or out of the nut, the position of the stop 27 may be adjusted according to the emergency speed setting desired. Thus mounted, the stop will be spaced a predetermined distance away from the fixed abutment 32 when the member 31 is seated against the latter as shown in Figs. 1 and 3, but is free to move downwardy from this position as shown in Fig. 2.

The operation of the auxiliary speeder spring adjusting mechanism is as follows. Normally it is ineffectual except for imposing an additional spring load at the low speed settings on the regular adjusting mechanism including the cable. In such a case, the movable abutment 15 is disposed above the stop 27 so as to move independently thereof. As the lever 25 is turned to move the abutment 15 downwardly and increase the loading of the spring 13 and the speed setting of the governor, a counterbored shoulder 35 on the plug 15 eventually contacts the stop 27 thereby taking up the slack in the lost motion connection between the movable abutment 15 and the member 31. Then, as the pinion is turned to further compress the spring 13, the member 31 is pulled downwardly away from the fixed abutment 32 as shown in Fig. 2. The arrangement thus permits of increasing the speed setting through the regular adjusting mechanism to any desired value above the intermediate or emergency setting which is determined by the loading of the spring 13 at the time of engagement between the stop 27 and the abutment 15 as the latter is lowered by the cable mechanism.

Now, if the regular adjusting mechanism becomes disabled for any reason so as to free the abutment 15 with the speed setting below the predetermined balancing speed, the springs 28 and 29 force the abutment 15 against the resistance of the speeder spring 13 until it reaches the stop 27. If the speed setting is above the balancing speed, the speeder spring 13 forces the whole assembly up until, at the time the manual adjuster is disabled, the member 31 reaches the fixed abutment 32. The parts are then positioned as shown in Fig. 3, and a definite loading of the speeder spring is established. In this condition, the force exerted by the springs 28 and 29 is greater than the opposing force of the spring 13, so that the preselected intermediate speed setting is determined positively by the action of the stop 27 rather than by a balancing of the opposing spring forces.

I claim as my invention:

1. The combination of a governor having a coiled speeder spring and an abutment bearing against one end of said spring and movable axially thereof to adjust the loading of the spring, means normally operable to position said abutment and maintain different positions of adjustment thereof, a fixed abutment spaced from said movable abutment on the side of the latter opposite said spring, a member mounted for movement toward and away from said fixed abutment, a compression spring stronger than said speeder spring acting between said movable abutment and said member to separate the two, an element disposed within said compression spring and connected at one end to said member, and a stop on the other end of said element acting to limit the movement of said movable abutment away from said member when the first mentioned abutment is released and moved by said stronger spring to overcome said speeder spring.

2. The combination of a speed regulator having a coiled speeder spring and an abutment bearing against one end of said spring and movable axially thereof to adjust the loading of the spring, means normally operable to position said abutment, a fixed abutment spaced from said movable abutment, a member mounted for movement toward and away from said fixed abutment, a compression spring stronger than said speeder spring acting between said movable abutment and said member, and a stop on said member limiting the movement of the movable abutment away from the member under the action of said compression spring whereby the latter establishes a predetermined intermediate speed setting of said speeder spring when said positioning means is disabled.

3. The combination of a speed regulator having a speeder spring and an abutment movable between high and low speed positions to adjust the loading of said spring, a fixed abutment, a member engageable with said fixed abutment and movable toward and away from the fixed abutment, spring means stronger than said speeder spring acting between said member and said movable abutment to urge the latter away from the fixed abutment and to urge said member toward the fixed abutment, and a stop movable with said member and limiting the movement of said movable abutment away from the member to establish an intermediate speed setting of the movable abutment upon freeing of the latter abutment for independent movement by the action of said stronger spring means.

4. The combination with a governor having a speeder spring and an abutment movable between high and low speed positions to adjust the loading of said spring of, means normally operable to variably position said abutment, an auxiliary spring stronger than said speeder spring and urging said abutment in the speed increasing direction, whereby the speeder spring is overcome by the auxiliary spring and said abutment moved when the latter is released to the action of the auxiliary spring, and a stop operable to limit the movement of said abutment by said auxiliary spring to a position intermediate said high and low speed positions while permitting of movement of the abutment to said high speed position by said positioning means and against the force of said auxiliary spring.

5. The combination with a governor having a speeder spring and an abutment movable between high and low speed positions to adjust the loading of said spring of, means normally operable to adjust the position of said abutment between said positions but releasable to permit free movement of the abutment, normally inactive means operable when said positioning means is released to move said abutment toward said high speed position, and a stop limiting the movement of said abutment by said last mentioned means to an intermediate position, said stop being urged toward a predetermined position but movable away from the latter by said positioning means to permit said abutment to be moved beyond the intermediate position by the positioning means.

6. The combination with a governor having a main speeder spring and an abutment movable between high and low speed positions of, releasable means normally operable to position said abutment and vary the loading of said spring over the entire range between said positions, auxiliary spring means stronger than said main spring and operable when said positioning means is released to move said abutment to a predetermined position intermediate said high and low speed positions, and a stop positively acting on said auxiliary spring means to limit the motion of said abutment to said predetermined position when the abutment is released to the action of the auxiliary spring means.

7. The combination with a governor having rotary fly-weights and a speeder spring exerting a force in opposition to the centrifugal force on said weights of a movable abutment for said spring, adjusting means for positioning said abutment to vary the force exerted by said spring on said fly-weights, said positioning means being to permit free movement of said abutment, an auxiliary spring acting on said abutment in opposition to said speeder spring and capable of overcoming the latter when said positioning means is disabled, and stop means positively limiting the movement of said abutment by said second spring to a position intermediate the range of movement of the abutment by said positioning means.

HUGH M. GREENMAN.